United States Patent
Lee et al.

(10) Patent No.: US 10,222,826 B2
(45) Date of Patent: Mar. 5, 2019

(54) DISPLAY DEVICE

(71) Applicant: Samsung Display Co., Ltd., Yongin-si (KR)

(72) Inventors: So-yeon Lee, Hwaseong-si (KR); Hyung-ku Kang, Seoul (KR); Gun-ho Kim, Yongin-si (KR); Ji-hae Kim, Hwaseong-si (KR); Hwajung Lee, Gimpo-si (KR); Taewon Chung, Yongin-si (KR); Ggochip Choi, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 5 days.

(21) Appl. No.: 15/581,223

(22) Filed: Apr. 28, 2017

(65) Prior Publication Data
US 2017/0322589 A1    Nov. 9, 2017

(30) Foreign Application Priority Data
May 3, 2016    (KR) .................. 10-2016-0054815

(51) Int. Cl.
*G06F 1/16*    (2006.01)
*G09G 3/20*    (2006.01)
(Continued)

(52) U.S. Cl.
CPC ......... *G06F 1/1601* (2013.01); *G09G 3/2092* (2013.01); *H04N 21/41* (2013.01); *H04N 21/4302* (2013.01); *H04N 21/4383* (2013.01)

(58) Field of Classification Search
CPC ...................................................... G06F 1/1601
See application file for complete search history.

(56) References Cited

U.S. PATENT DOCUMENTS

| 5,257,164 | A | * | 10/1993 | Perez | F16M 11/10 |
| | | | | | 361/679.22 |
| 6,163,451 | A | * | 12/2000 | Chiu | F16M 11/10 |
| | | | | | 248/419 |

(Continued)

FOREIGN PATENT DOCUMENTS

| JP | 2009-069523 | 4/2009 |
| KR | 10-2015-0017958 | 2/2015 |

*Primary Examiner* — Hoa C Nguyen
*Assistant Examiner* — Keith DePew
(74) *Attorney, Agent, or Firm* — H.C. Park & Associates, PLC

(57) ABSTRACT

A display device includes a cradle and a display module. The cradle includes a signal transmission unit configured to transmit an image signal, a housing exposing the signal transmission unit. The display module has a curved shape along a radius of a curvature and includes a signal reception unit configured to receive the image signal, an image display unit configured to display an image based on the image signal, and a second coupling member. The display device is configured to operate in any one of a first state and a second state, in which during the first state, the cradle and the display module are decoupled from each other, and in which during the second state, the first coupling member and the second coupling member are slide-coupled to each other, such that the display module moves along the circumference of a circle of the curvature of the display module.

20 Claims, 16 Drawing Sheets

(51) Int. Cl.
   *H04N 21/438*   (2011.01)
   *H04N 21/43*    (2011.01)
   *H04N 21/41*    (2011.01)

(56) References Cited

U.S. PATENT DOCUMENTS

| | | | |
|---|---|---|---|
| 2003/0103170 A1* | 6/2003 | Nagata | G02F 1/133308 |
| | | | 348/794 |
| 2006/0022097 A1* | 2/2006 | Homer | G06F 1/1601 |
| | | | 248/146 |
| 2008/0134550 A1* | 6/2008 | Sun | G06F 1/1601 |
| | | | 40/491 |
| 2010/0027207 A1* | 2/2010 | Jin | G06F 1/1626 |
| | | | 361/679.21 |
| 2010/0118000 A1* | 5/2010 | Gu | G06F 1/1601 |
| | | | 345/204 |
| 2011/0174952 A1* | 7/2011 | Huang | F16M 11/041 |
| | | | 248/371 |
| 2015/0091729 A1 | 4/2015 | Phillips et al. | |
| 2016/0050772 A1* | 2/2016 | Park | H04N 5/64 |
| | | | 361/807 |
| 2017/0068274 A1* | 3/2017 | Van Hees | G06F 1/1637 |
| 2017/0255232 A1* | 9/2017 | Ram | G06F 1/1601 |
| 2017/0271614 A1* | 9/2017 | Lee | H05K 5/03 |
| 2018/0011518 A1* | 1/2018 | Choi | H04N 5/64 |

* cited by examiner

DISPLAY DEVICE

CROSS-REFERENCE TO RELATED APPLICATION

This application claims priority from and the benefit of Korean Patent Application No. 10-2016-0054815, filed on May 3, 2016, which is hereby incorporated by reference for all purposes as if fully set forth herein.

BACKGROUND

Field

Exemplary embodiments relate to a display device, and more particularly, to a display device that includes a display module and a cradle.

Discussion of the Background

A display device is used for displaying images on various information processing devices, such as a TV, monitor, notebook computer, and mobile phone. A display device that includes a display module having a bent shape, as well as a display device that includes a flat-panel display module, are being recently developed. The display device that includes the display module having the bent shape may include a display region that has a curved shape, through which a 3D effect, an immersion effect, and a presence effect may be provided to a user.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device including a display module that may be moved along a circle of a curvature of the display module to secure an optimal viewing angle even when the location of a user varies.

Exemplary embodiments also provide a slim display device.

Exemplary embodiments further provide a display device that may individually manage a display module and a cradle.

Additional aspects will be set forth in the detailed description which follows, and, in part, will be apparent from the disclosure, or may be learned by practice of the inventive concept.

An exemplary embodiment discloses a display device including: a cradle including a signal transmission unit configured to transmit an image signal, a housing exposing the signal transmission unit, and a first coupling member disposed in the housing; and a display module having a curved shape along a radius of a curvature and including a signal reception unit configured to receive the image signal, an image display unit configured to display an image based on the image signal, and a second coupling member. The display device is configured to operate in any one of a first state and a second state, in which during the first state, the cradle and the display module are decoupled from each other, and during the second state, the first coupling member and the second coupling member are slide-coupled to each other, such that the display module moves along the circumference of a circle of the curvature of the display module.

An exemplary embodiment also discloses a display device including: a cradle including a signal transmission unit configured to transmit an image signal, a first coupling member, and a second coupling member slide-coupled to the first coupling member, in which the signal transmission unit is disposed in the second coupling member; and a display module including a signal reception unit configured to receive the image signal, and an image display unit having a bent shape and configured to display an image based on the image signal. The display device is configured to operate in any one of a first state and a second state, in which during the first state, the cradle and the display module are decoupled from each other, and during the second state, the display module and the second coupling member are coupled such that the signal transmission unit and the signal reception unit are electrically connected to each other.

An exemplary embodiment also discloses a display device including: a cradle including a signal transmission unit configured to transmit an image signal; and a display module including a signal reception unit configured to receive the image signal, an image display unit configured to display an image based on the image signal, a first coupling member, and a second coupling member slide-coupled to the first coupling member. The display device is configured to operate in any one of a first state and a second state, in which during the first state, the cradle and the display module are decoupled from each other, and during the second state, the cradle and the second coupling member are in contact with each other such that the signal transmission unit and the signal reception unit are electrically connected to each other.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1A:
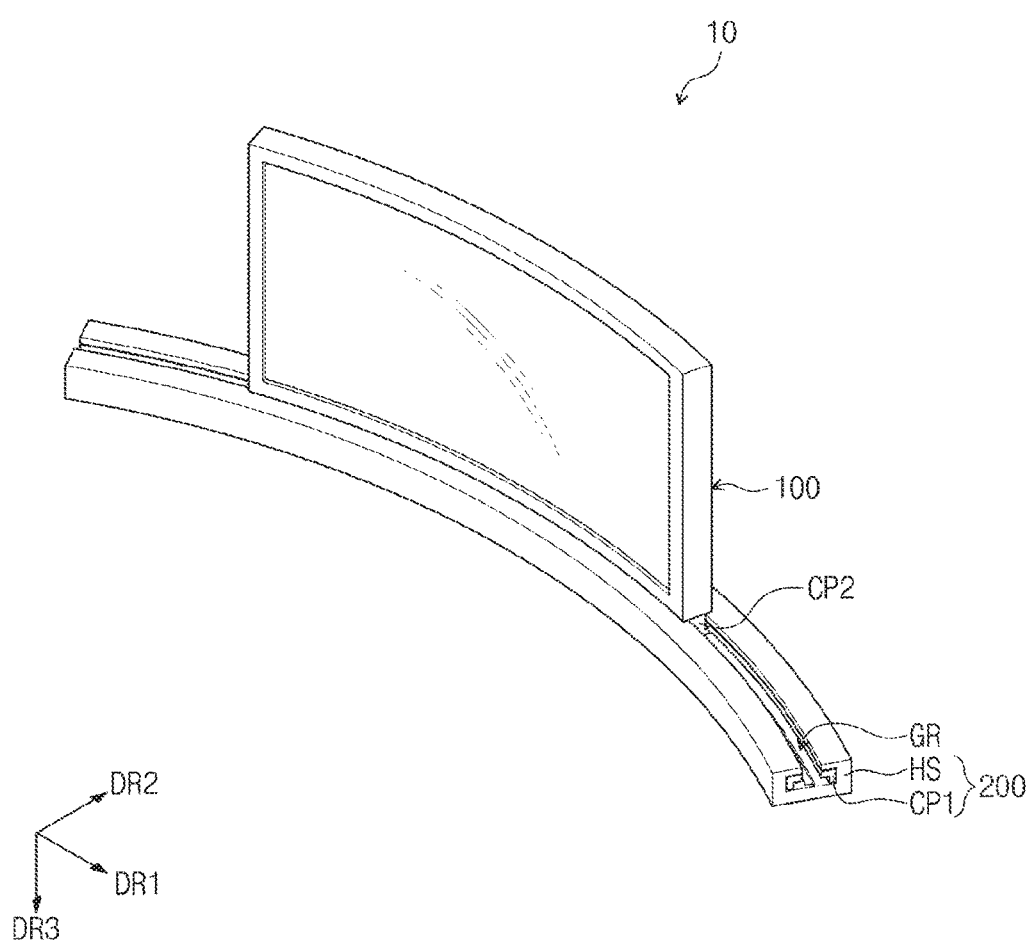
FIG. 1A is a schematic perspective view of a display device according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1B:
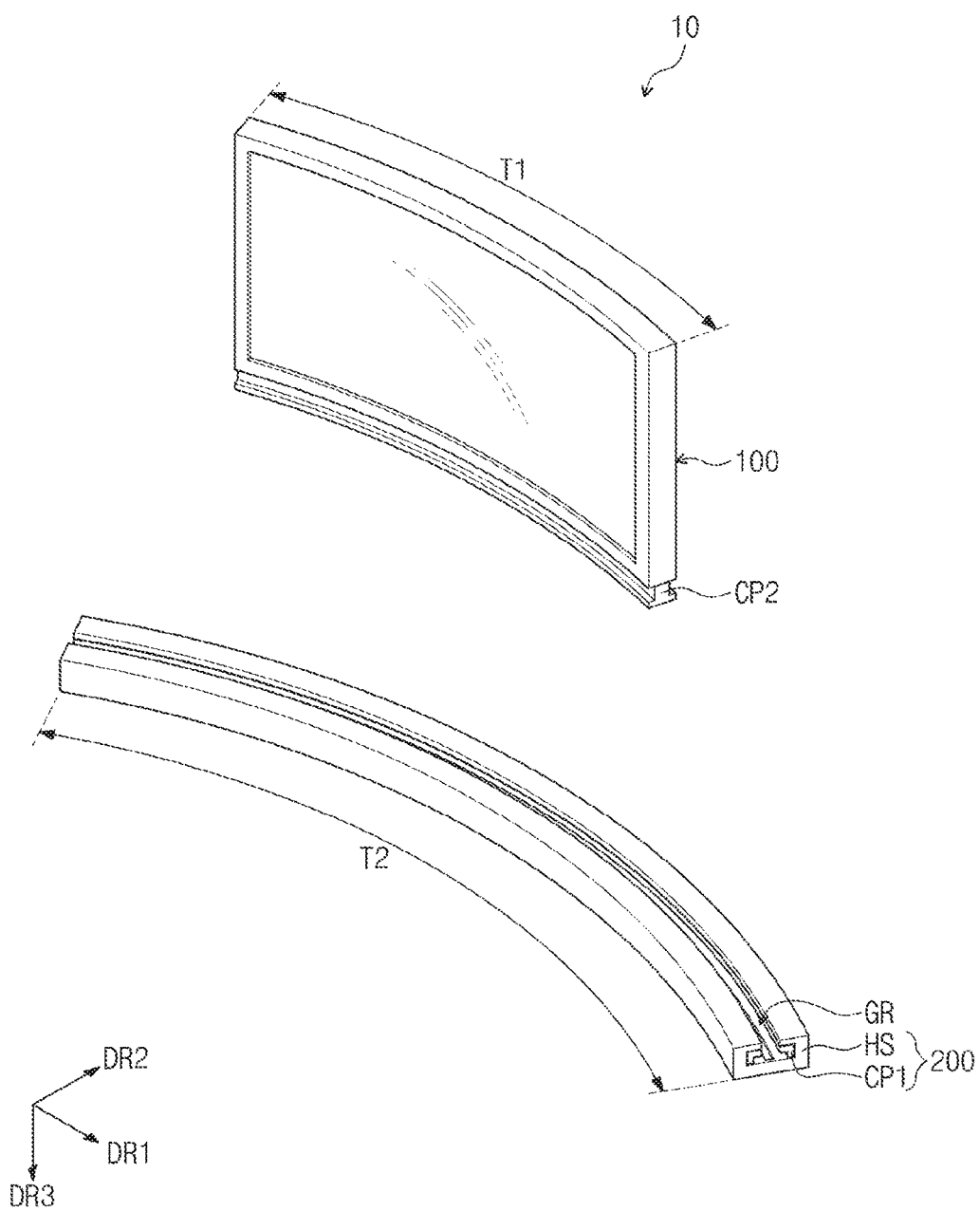
FIG. 1B is a schematic, exploded perspective view of a display device according to an exemplary embodiment.

FIG. 1A is a schematic perspective view of a display device according to an exemplary embodiment. FIG. 1B is a schematic, exploded perspective view of a display device according to an exemplary embodiment.

Referring to FIGS. 1A and 1B, a display device 10 according to an exemplary embodiment includes a display module 100 and a cradle 200.

The cradle 200 may include a first coupling member CP1 and a housing HS. The first coupling member CP1 may be disposed in the housing HS. The first coupling member CP1 may be coupled to the display module 100. The display module 100 may be moved along a circle of curvature of the display module 100 while being coupled to the first coupling member CP1.

The housing HS may surround at least a portion of the first coupling member CP1. The housing HS may include a coupling groove GR that houses a portion of the display module 100. The coupling groove GR may be bent to have a certain radius of curvature. The first coupling member CP1 may be disposed in the inner wall of the coupling groove GR. The display module 100 receives an image signal (ES in FIG. 2) to display an image. The display module 100 may be detachable from the cradle 200.

The display module 100 may include a second coupling member CP2. The second coupling member CP2 may be coupled to the first coupling member CP1. The display module 100 may move along a circle of curvature of the display module 100 when being coupled to the cradle 200.

In the display device 10 according to an exemplary embodiment, the length T1 of the display module 100 may be shorter than the length T2 of the cradle 200. When the display module 100 and the cradle 200 are coupled to each other, the display module 100 may move along the coupling groove GR of the cradle 200.

The display device 10 may operate in any one of a first state and a second state. During the first state, the display module 100 and the cradle 200 may be decoupled from each other. During the second state, the display module 100 may be slide-coupled to the cradle 200, such that the display module 100 may move along the circumference of the circle of curvature of the display module 100.

During the second state, a portion of the display module 100 may be housed in the coupling groove GR such that the display module 100 may face a user. The display module 100 may be bent while being coupled to the cradle 200. More particularly, the display module 100 may have a curved shape. For example, the display module 100 may be bent, such that the display module 100 has a concave shape with respect to a viewing direction of a user. However, the shape of the display module 100 may be varied. For example, the display module 100 may have a convex shape with respect to a viewing direction of a user.

The display module 100 may be rigid or flexible. As used herein, the term "flexible" refers to a bendable characteristic thereof, which may range from a completely foldable structure to a structure that may be bent to a level of several nanometers.

When the display module 100 is rigid, the display module 100 may maintain a bent shape even after the display module 100 is decoupled from the cradle 200. When the display module 100 is flexible, the display module 100 may have a flat shape when the display module 100 is decoupled from the cradle 200. In particular, when the flat display module 100 is bent and coupled to the cradle 200, the display module 100 may slidingly move in a bent state when coupled to the cradle 200.

During the second state, the first coupling member CP1 and the second coupling member CP2 may be slide-coupled. FIGS. 1A and 1B show that the first coupling member CP1 is a slide rail and the second coupling member CP2 is a slider that is slide-coupled to the slide rail.

As used herein, first, second, and third directions DR1, DR2, and DR3 are defined as directions that are orthogonal to one another. FIGS. 1A and 1B show that the display module 100 has a bent shape with respect to a central axis that is in parallel to the third direction DR3. Also, FIGS. 1A and 1B show that the bottom surface of the cradle 200 is substantially parallel to a plane formed by the first direction DR1 and the second direction DR2.

Figure 2:
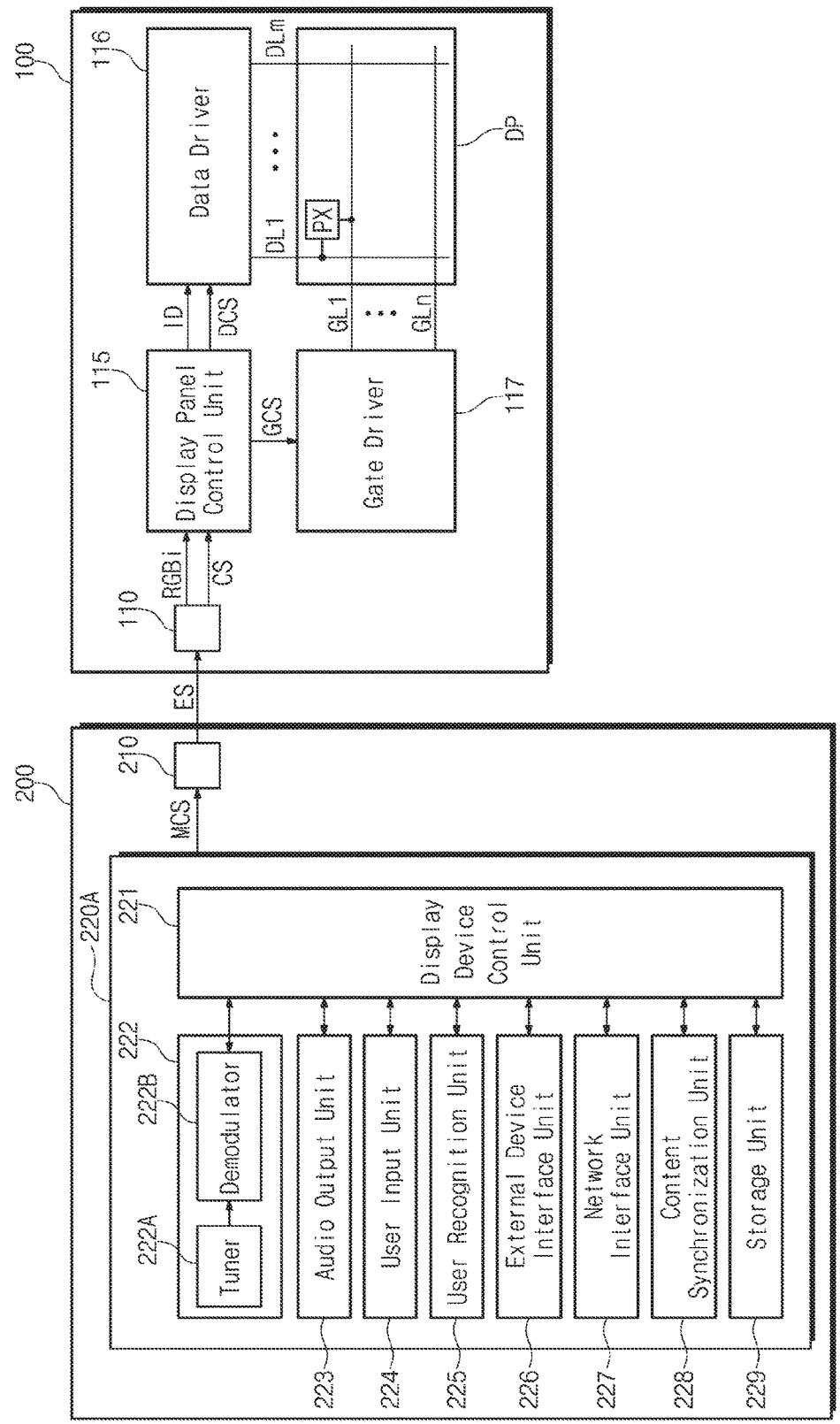
FIG. 2 is a schematic block diagram of a display device according to an exemplary embodiment.

FIG. 2 is a schematic block diagram of a display device according to an exemplary embodiment.

Referring to FIG. 2, the cradle 200 includes a signal transmission unit 210 and an electrical module 220A. The signal transmission unit 210 receives a main control signal MCS from the electrical module 220A and provides an image signal ES to the display module 100.

The electrical module 220A includes a display device control unit 221, a broadcast reception unit 222, an audio output unit 223, a user input unit 224, a user recognition unit 225, an external device interface unit 226, a network interface unit 227, a content synchronization unit 228, and a storage unit 229. In the electrical module 220A, at least one of the broadcast reception unit 222, the audio output unit 223, the user input unit 224, the user recognition unit 225, the external device interface unit 226, the network interface unit 227, the content synchronization unit 228, and the storage unit 229 may be omitted.

The broadcast reception unit 222 may receive broadcast content and streaming content that re-transmits the broadcast content. The broadcast content may be received from a broadcasting station and the streaming content may be received from a streaming server. The streaming server may be various servers that provide live or recorded broadcast content, various pieces of video content, or the like, through a streaming technique.

The broadcast reception unit 222 may include a tuner 222A and a demodulator 222B. The tuner 222A selects radio frequency (RF) broadcast signals that correspond to channels selected by a user or all of pre-stored channels, among RF broadcast signals received through an antenna. Also, the tuner 222A converts the selected RF broadcast signal into an intermediate frequency (IF) signal, baseband image, or voice signal. For example, when the selected RF broadcast signal is a digital broadcast signal, the tuner 222A converts the selected signal into a digital IF signal, and when the selected RF broadcast signal is an analog broadcast signal, the tuner 222A converts the selected signal into an analog baseband image or voice signal. The tuner 222A may process the digital broadcast signal or the analog broadcast signal. The tuner 222A may receive a single-carrier RF broadcast signal according to an advanced television system committee (ATSC) standard or a multiple-carrier RF broadcast signal according to a digital video broadcasting (DVB) standard.

The demodulator 222B receives the converted digital IF signal from the tuner 222A to perform demodulation. The demodulator 222B may perform demodulation and channel decoding, and then may output a stream signal. The stream signal may be a multiplexed signal of an image signal, voice signal, or data signal. The stream signal output from the demodulator 222B may be input to the display device control unit 221.

The display device control unit 221 performs de-multiplexing, image signal processing, voice signal processing, or the like, and then provides an image signal ES to the display module 100.

The audio output unit 223 may output sound corresponding to the image displayed on the display module 100. The audio output unit 223 may receive the voice processed signal from the display device control unit 221 and output signal. The audio output unit 223 may be provided in the form of a speaker.

The user input unit 224 delivers a control command input by a user to the display device control unit 221 or delivers a signal received from the display device control unit 221 to the user.

The user recognition unit 225 may include a camera. The user recognition unit 225 may use the camera to image a user and recognize the user based on the image. The image information may be input to the display device control unit 221.

The external device interface unit 226 may transmit or receive data to/from an accessed external device. To this end, the external device interface unit 226 may include an RF communication unit, an A/V input/output unit, an USB housing terminal, a high definition multimedia interface (HDMI) connecting terminal, an RGB connecting terminal, or the like. The external device interface unit 226 may access an external device, such as a digital versatile disk (DVD), Blu-ray, game console, camera, camcorder, computer, notebook computer, or set-top box by using a wired or wireless method, and also perform input and output operations with the external device. The A/V input/output unit may receive image and voice signals from the external device. The RF communication unit may perform near field communication with other electronic devices.

The network interface unit 227 provides an interface for connecting the display device 10 to a wireless or wired network that includes the internet network. For example, the network interface unit 227 may receive, through a network, content or data that is provided by an internet, content provider, or a network operator.

The content synchronization unit 228 may allow an image to be displayed on the display module 100, according to a synchronization reference time received from a content synchronization server. The synchronization reference time may be a time that is set based on content identification information. The content synchronization unit 228 may include a memory that includes received image content.

The storage unit 229 may store programs for processing and controlling each signal in the display device control unit 221, or store a signal processed image, voice, or a data signal. The storage unit 229 may also temporarily store the image, voice, or data signal that is input to the external device interface unit 226. The storage unit 229 may store information on a certain broadcast channel through a channel memory function, such as a channel map.

A conventional display device may include at least one of a display device control unit, a broadcast reception unit, an audio output unit, a user input unit, a user recognition unit, an external device interface unit, a network interface unit, a content synchronization unit, and a storage unit in an electrical module, and thus, it may be difficult to form a slim display module.

The display device 10 according to an exemplary embodiment includes the electrical module 220A for driving the display module 100 in the cradle 200, and thus, the display module 100 may be formed slim.

The display module 100 includes a signal reception unit 110, an image display unit DP, a display panel control unit 115, a data driver 116, and a gate driver 117. The signal reception unit 110 receives an image signal ES from the signal transmission unit 210. The image display unit DP displays an image.

The display panel control unit 115 controls the driving of the data driver 116 and the gate driver 117. An input image signal RGBi and controls signals CS are received from the signal reception unit 110. The display panel control unit 115 converts the data format of the input image signal RGBi according to the interface specification of the data driver 116 and the structure of the image display unit DP to generate output image data ID, and provides the output image data ID to the data driver 116.

The display panel control unit 115 generates a gate control signal GCS (e.g., vertical start signal, vertical clock signal, and vertical clock bar signal) and a data control signal DCS (e.g., output start signal and horizontal start signal) based on the plurality of control signals CS. The gate control signal GCS is provided to the gate driver 117, and the data control signal DCS is provided to the data driver 116.

The data driver 116 converts the output image data ID to data voltages in response to the data control signal DCS provided by the display panel control unit 115 to output the data voltages obtained through conversion. The output data voltages are applied to the image display unit DP.

The gate driver 117 sequentially outputs gate signals in response to the gate control signal GCS provided by the display panel control unit 115.

The image display unit DP includes gate lines GL1 to GLn, data lines DL1 to DLm, and pixels PX. FIG. 2 illustrates only the first and $n^{th}$ gate lines GL1 and GLn among the gate lines GL1 to GLn. Also, FIG. 2 illustrates only the first and $m^{th}$ gate lines DL1 and DLm among the data lines DL1 to DLm.

The gate lines GL1 to GLn are connected to the gate driver 117 to receive gate signals from the gate driver 117. The data lines DL1 to DLm are connected to the data driver 116 to receive data voltages from the data driver 116.

The pixels PX are arranged in a matrix form. The pixels PX may show at least one of primary colors, such as red, green, and blue. The colors that the pixels PX may show are not limited to the red, green, and blue, and the pixels PX may also show various colors, such as secondary primary colors, such as white, yellow, cyan, and magenta in addition to the red, green, and, blue.

The pixels PX may be defined as components that display a unit image, and the resolution of the image display unit DP may be determined according to the number of pixels PX in the image display unit DP. FIG. 2 shows only a single pixel PX, and remaining pixels are not shown. The pixels PX may be driven when connected to a corresponding gate line and a corresponding data line.

Figure 3:
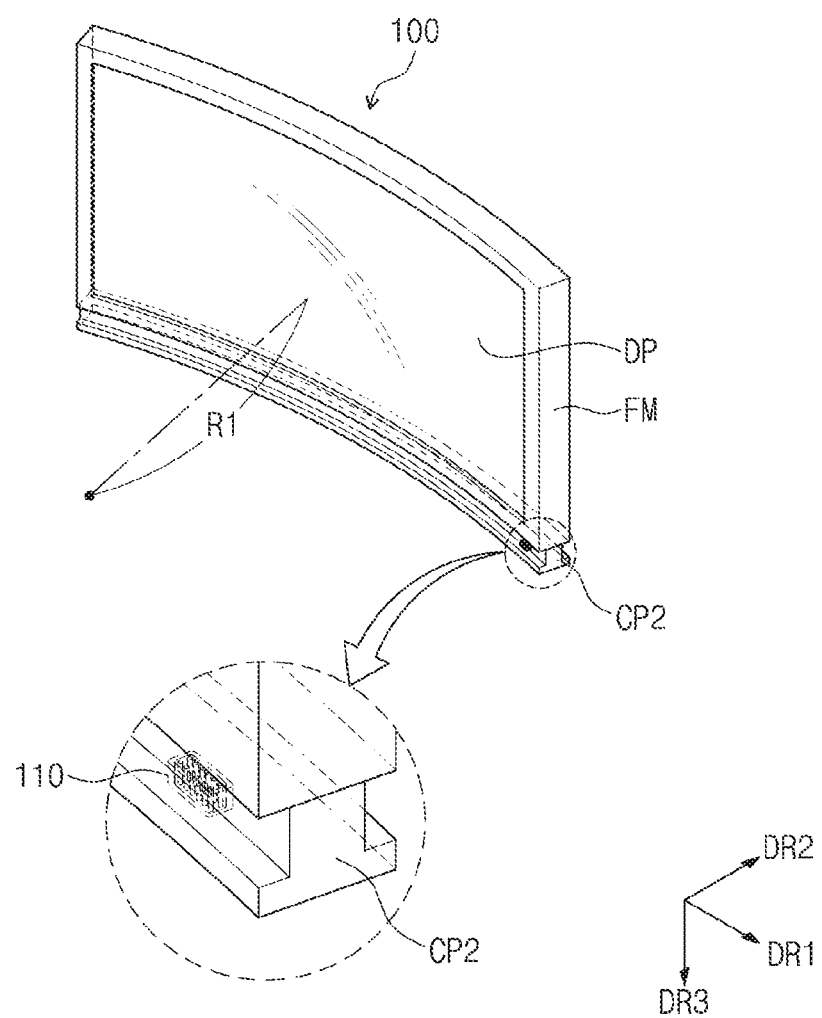
FIG. 3 is a schematic perspective view of a display module included in a display device according to an exemplary embodiment.
Figure 4:
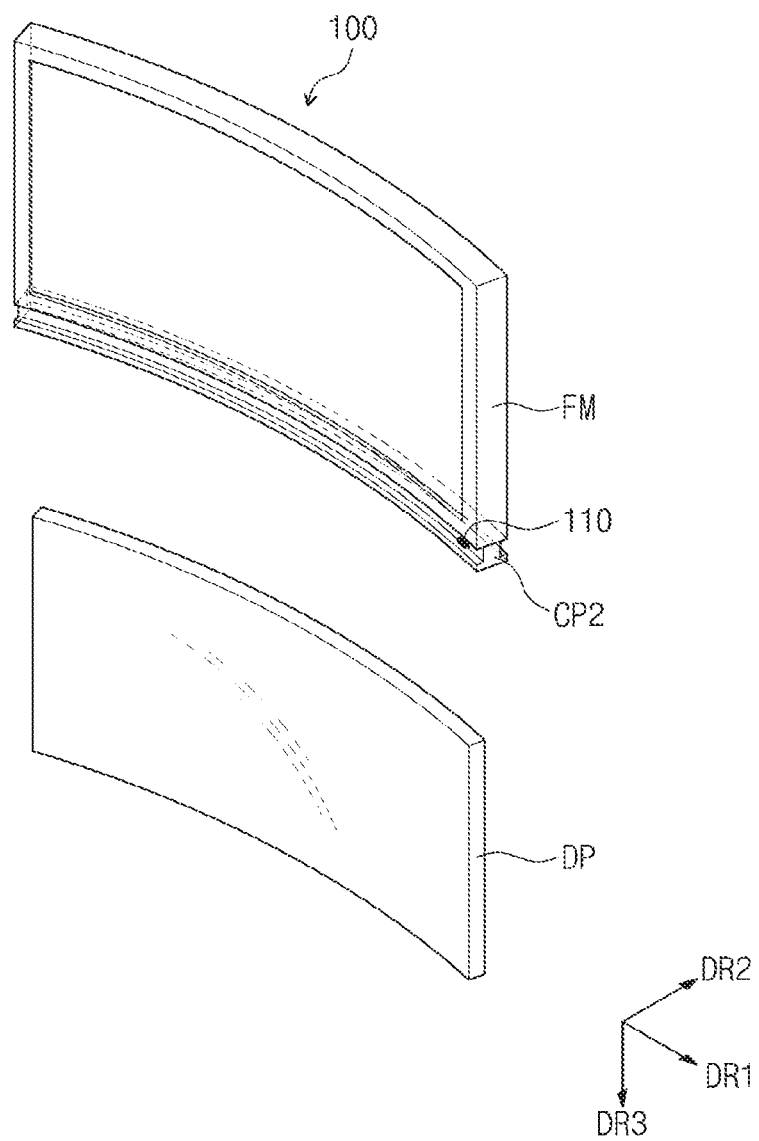
FIG. 4 is a schematic, exploded perspective view of a display module included in a display device according to an exemplary embodiment.

FIG. 3 is a schematic perspective view of a display module included in a display device according to an exemplary embodiment. FIG. 4 is a schematic, exploded perspective view of a display module included in a display device according to an exemplary embodiment.

Referring FIG. 3, the display module 100 may have a curved shaped along a first radius of curvature R1 when coupled to the cradle 200. For example, the first radius of curvature R1 may be about 2000 mm to about 5000 mm. When the first radius of curvature R1 is less than about 2000 mm, it may be difficult for a user to effectively recognize a displayed image, and when the first radius of curvature R1 is greater than about 5000 mm, a user may have a reduced awareness of any or all of the 3D effect, immersion effect, and presence effect of an image displayed on the display device 10.

Referring to FIGS. 3 and 4, the display module 100 may include an image display unit DP and a frame FM.

The image display unit DP may be bent. The image display unit DP may be an organic light emitting display panel, a liquid crystal display panel, a plasma display panel, an electrophoretic display panel, a microelectromechanical system display panel (MEMS), an electrowetting display panel, or the like.

The image display unit DP may also be rigid or flexible. Although the display panel DP of the display device 10 is described as having a curved shape, the shape of the display panel according to an exemplary embodiment may be varied, such as a flat shape.

The frame FM surrounds at least a portion of the edge of the image display unit DP. The frame FM may maintain the shape of the image display unit DP. Although not shown, the frame FM may include at least one of a bottom chassis, a mold frame FM, and a top chassis.

The second coupling member CP2 may be coupled to the lower part of the frame FM. The second coupling member CP2 may be a slider that has a bent shape. The second coupling member CP2 may be formed as a single part.

The display module 100 may further include the signal reception unit 110 disposed at the bottom surface of the second coupling member CP2. The display module 100 may receive an image signal (ES in FIG. 2) through the signal reception unit 110. FIGS. 3 and 4 illustrate that the signal reception unit 110 is disposed adjacent to a side surface of the display module 100. However, the location of the signal reception unit 110 may be varied, for example, the signal reception unit 110 may be alternatively disposed adjacent to the other side surface of the display module 100 or at the center of the display module 100.

Although FIGS. 3 and 4 show that the display module 100 includes a single signal reception unit 110, the number of the signal reception unit 110 may be varied. In addition, although the signal reception unit 110 is shown as having the form of a receiving terminal into which a cable is inserted, the signal reception unit 110 may have any shapes that may receive an image signal ES from the cradle 200.

Figure 5:
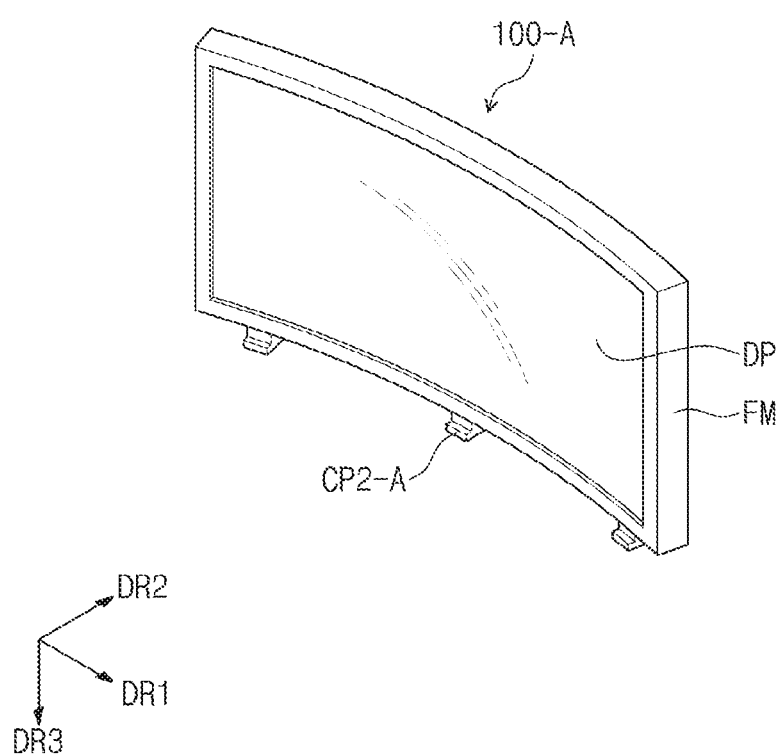
FIG. 5 is a perspective view of a variation of a display module according to an exemplary embodiment.

FIG. 5 is a perspective view of a display module according to an exemplary embodiment.

The display module 100-A shown in FIG. 5 has a difference in a second coupling member CP2-A, as compared to the display module 100 shown in FIGS. 3 and 4.

The second coupling member CP2-A may be coupled to the lower part of the frame FM. The second coupling member CP2-A may have a shorter length than the second coupling member CP2 shown in FIGS. 3 and 4. The display module 100-A may include multiple second coupling members CP2-A. FIG. 5 illustrates that the number of the second coupling members CP2-A is three, however, the number of the second coupling members CP2-A may be two or more.

Figure 6:
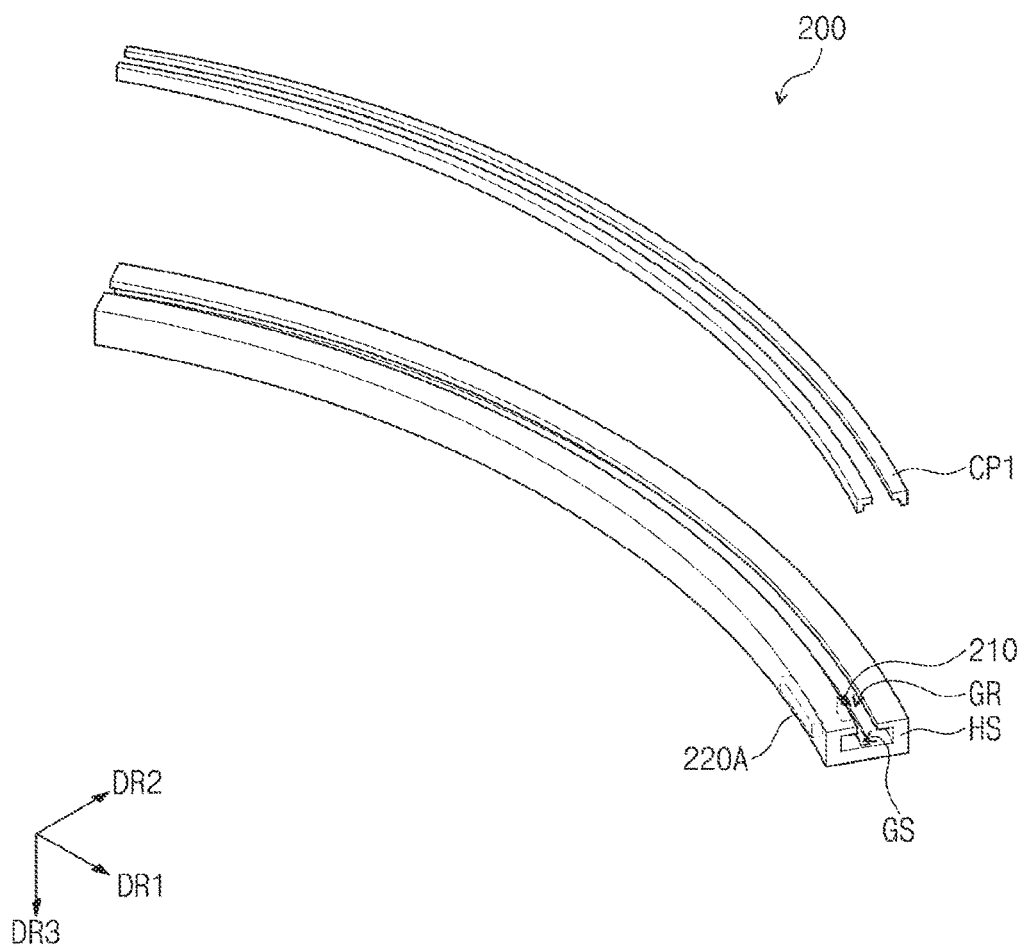
FIG. 6 is an exploded perspective view of a cradle of a display device according to an exemplary embodiment.
Figure 7:
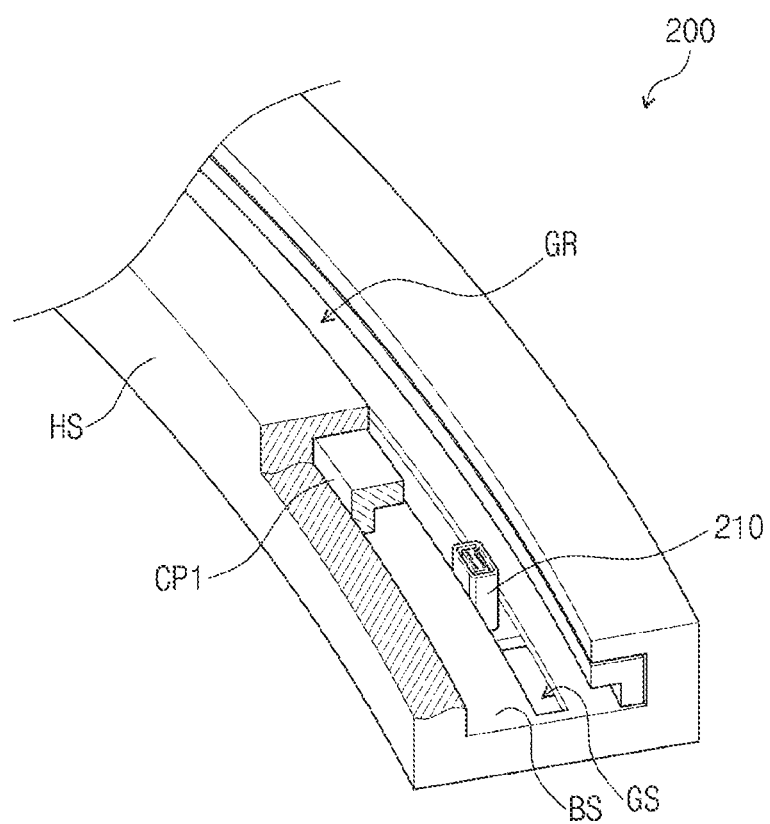
FIG. 7 is an enlarged perspective view of a portion of the cradle of FIG. 6.

FIG. 6 is an exploded perspective view of a cradle of a display device according to an exemplary embodiment, and FIG. 7 is an enlarged perspective view of a portion of the cradle.

The cradle 200 may include a signal transmission unit 210, an electrical module 220A, a first coupling member CP1, and a housing HS. The signal transmission unit 210 may receive a main control signal MCS from the electrical module 220A and provide an image signal ES to the signal reception unit 110.

The housing HS has a receiving groove GS, and the signal transmission unit 210 may be exposed through the receiving groove GS. The receiving groove GS may pass through the bottom surface BS of the housing HS that is exposed by the coupling groove GR. The receiving groove GS may have a shape that is bent along the coupling groove GR.

The signal transmission unit 210 may move along the coupling groove GR and the receiving groove GS. The signal transmission unit 210 may receive a main control signal MCS from the electrical module 220A and provide an image signal ES to the signal reception unit 110. While the display module 100 and the cradle 200 are coupled, the signal transmission unit 210 and the signal reception unit 110 may be electrically connected to each other, and the display module 100 may be slidingly moved in the coupled state.

Although the signal transmission unit 210 and the signal reception unit 110 are described as being in physical contact with each other during the second state of the display device for electrical connection, however, according to an exemplary embodiment, the signal transmission unit 210 and the signal reception unit 110 may be communication modules that may alternatively perform one-way or two-way wireless communication. In this manner, the signal transmission unit 210 may provide an image signal ES to the signal reception unit 110 wirelessly.

The first coupling member CP1 may be disposed in the inner wall of the housing HS. Although FIGS. 6 and 7 illustrate that the first coupling member CP1 is a pair of slide rails that face each other, a configuration of the first coupling member CP1 may be varied, as long as the first coupling member CP1 and the second coupling member CP2 may be slide-coupled to each other.

The electrical module 220A provides a main control signal MCS to the signal transmission unit 210 for displaying an image on the display module 100. Although FIG. 6 shows that the electrical module 220A has a bent thick rectangular shape, the electrical module 220A may also be provided in the form of a bent thin chip. Also, the location of the electrical module 220A may be varied, as long as the electrical module is housed in the housing HS. In addition, although FIG. 6 shows the electrical module 220A as a single member, the electrical module 220A may alternatively be formed to contain multiple members.

Figure 8:
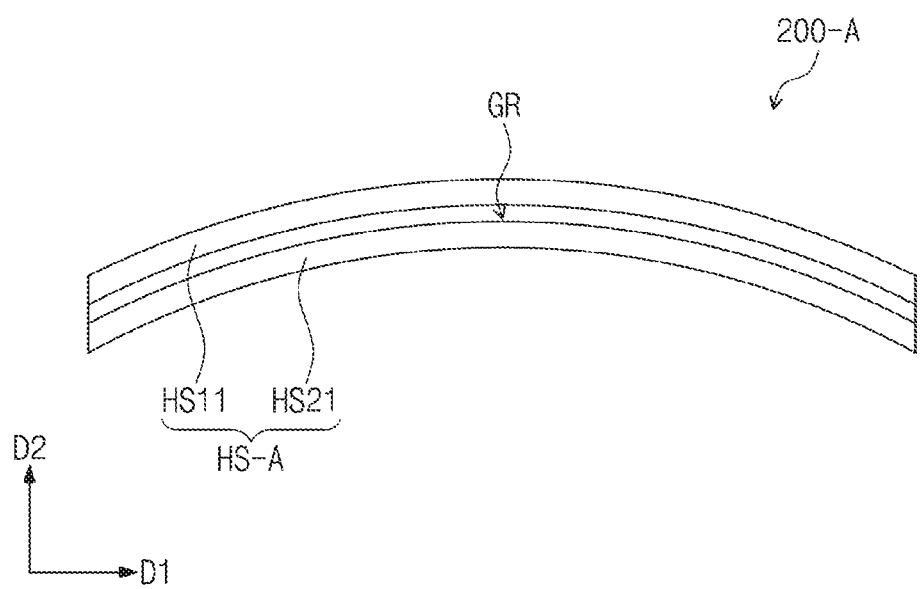
FIGS. 8 and 9 are plan views of housings of a cradle of a display device according to an exemplary embodiment.
Figure 9:
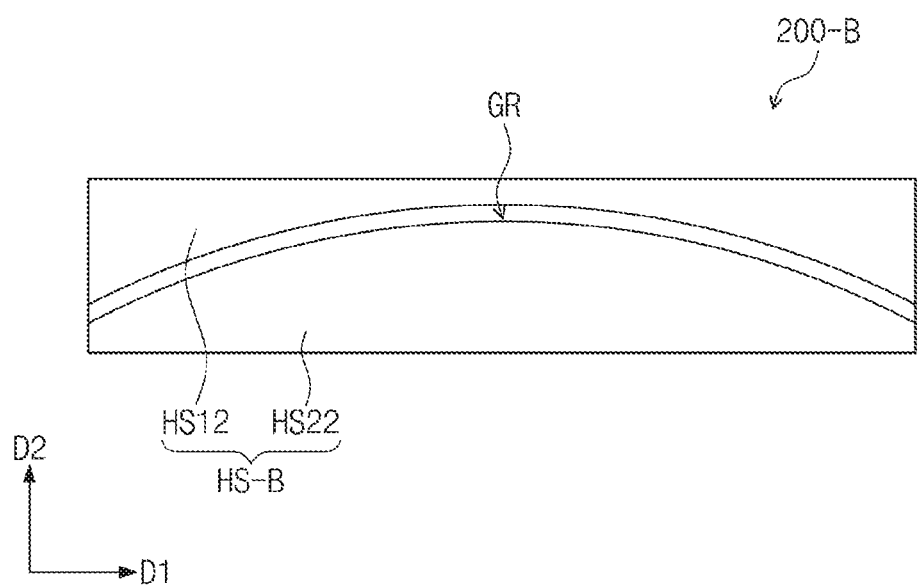

FIGS. 8 and 9 are plan views of housings of a cradle of a display device according to an exemplary embodiment. The housings shown in FIGS. 8 and 9 are views of the housing shown in FIG. 6 from the third direction D3.

The housing HS-A of the cradle 200-A shown in FIG. 8 may include a first top surface HS11 disposed on one side of the coupling groove GR, and a second top surface HS21 disposed on the other side of the coupling groove GR.

Referring to FIG. 8, each of the first top surface HS11 and the second top surface HS21 may have a constant width in the second direction DR2. A first side of the first top surface HS11 contacting the coupling groove GR and a second, opposing side thereof may have the same radius of curvature. A first side of the second top surface HS21 contacting the coupling groove GR and a second, opposing side thereof may have the same radius of curvature.

The housing HS-B of the cradle 200-B shown in FIG. 9 may include a first top surface HS12 that is defined on one side of the coupling groove GR, and a second top surface HS22 that is defined on the other side of the coupling groove GR.

Referring to FIG. 9, each of the first top surface HS12 and the second top surface HS22 may not have a constant width in the second direction DR2. The first top surface HS12 may have a width that becomes progressively thicker in a direction away from the center thereof. The second top surface HS22 may have a width that becomes progressively smaller in a direction away from the center thereof. A first side of the first top surface HS12 contacting the coupling groove GR may have a certain radius of curvature, and a second, opposing side of the first top surface HS12 may be flat. A first side of the second top surface HS22 contacting the coupling groove GR may have a certain radius of curvature and a second, opposing side of the second top surface HS22 may be flat.

According to an exemplary embodiment, the display module 100 of the display device 10 may move along a circle of curvature of the display module 100 to secure an optimal viewing angle even when the location of a user varies.

Also, according to an exemplary embodiment, the electrical module 220A may be disposed in the cradle 200 to achieve the slimness of the display device 10. In addition, according to an exemplary embodiment, the display module 100 and the cradle 200 may be individually managed since the display module may be decoupled from the cradle 200.

Figure 10A:
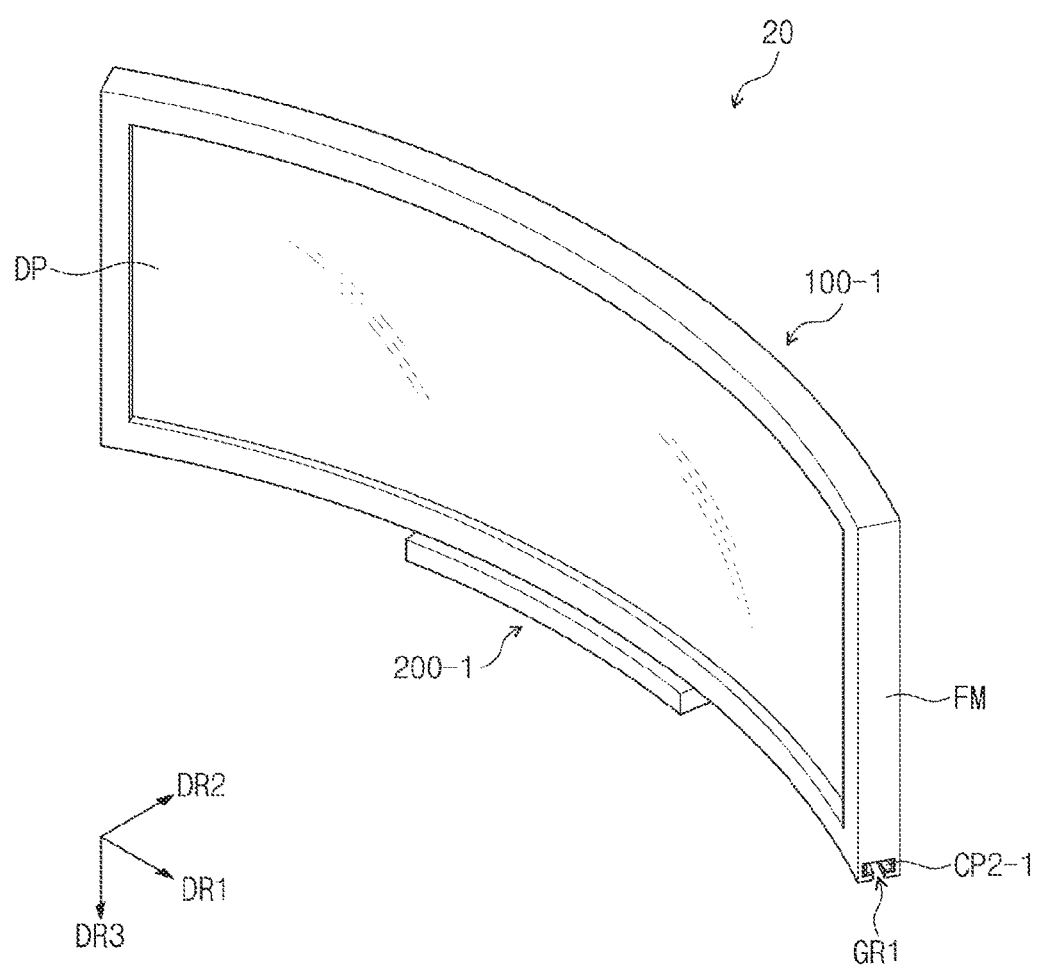
FIG. 10A is a schematic perspective view of a display device according to an exemplary embodiment.
Figure 10B:
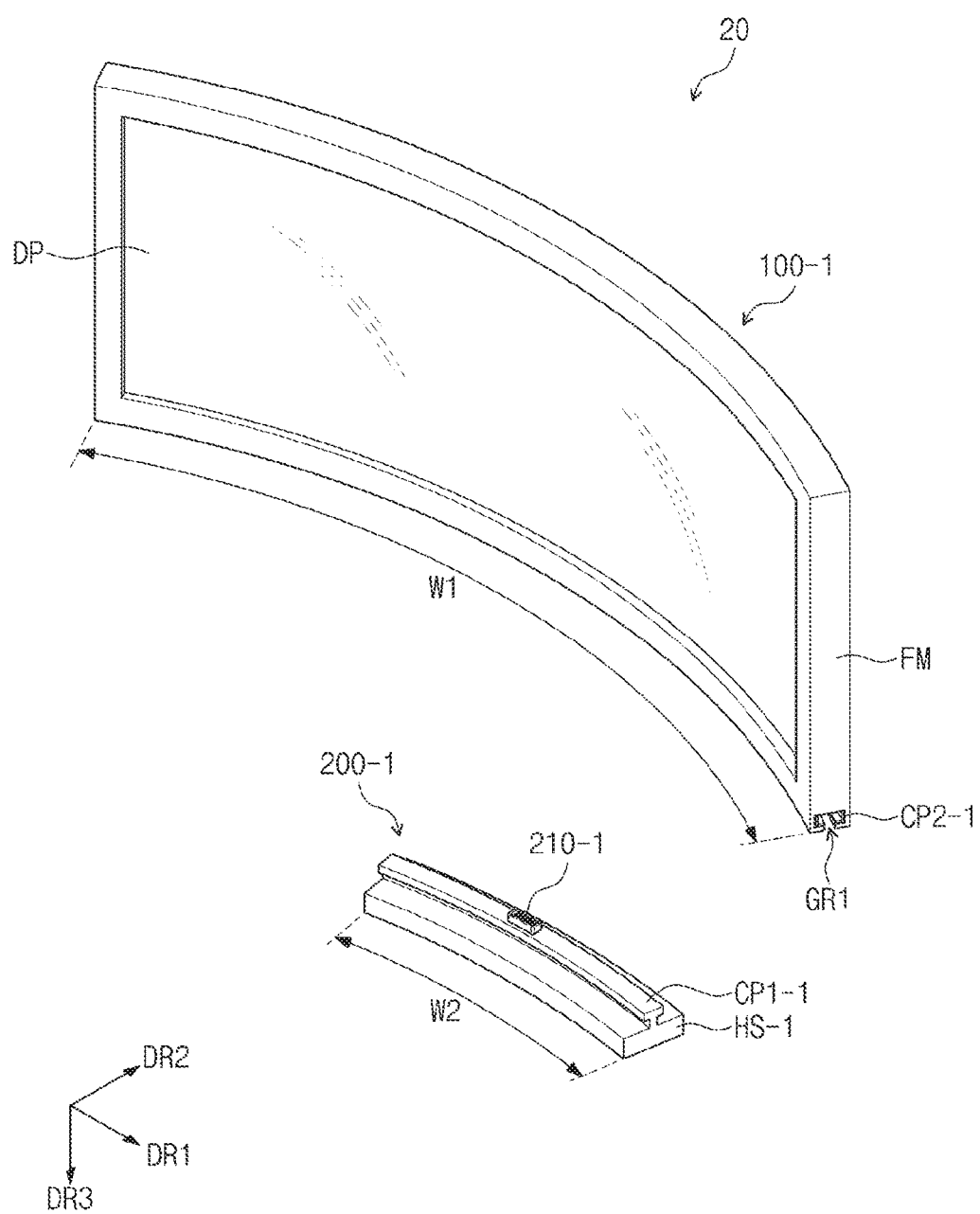
FIG. 10B is a schematic, exploded perspective view of a display device according to an exemplary embodiment.
Figure 10C:
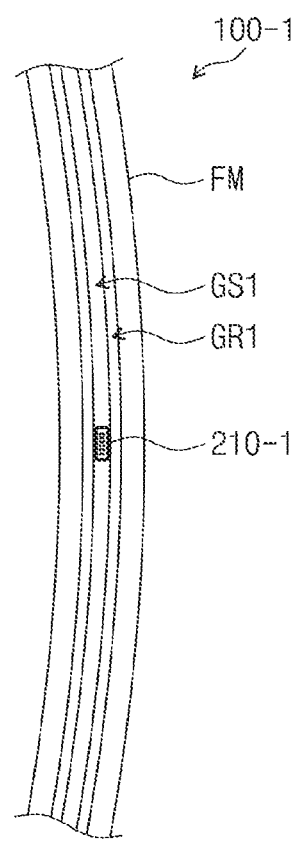
FIG. 10C is a plan view of a rear surface of a display module in FIG. 10A.

FIG. 10A is a schematic perspective view of a display device according to an exemplary embodiment. FIG. 10B is a schematic, exploded perspective view of a display device according to an exemplary embodiment. FIG. 10C is a plan view of a rear surface of a display module in FIG. 10A.

Hereinafter, the following descriptions will be mainly focused on the difference between a display device 20 shown in FIGS. 10A to 10C and the display device 10 shown in FIGS. 1A and 1B.

A cradle 200-1 may include a housing HS-1 and a first coupling member CP1-1. The housing HS-1 may have a bent shape when viewed from the third direction DR3. FIGS. 10A and 10B show the housing HS-1 having a bent hexahedron shape.

A first coupling member CP1-1 may be protruded from the top surface of the housing HS-1. The first coupling member CP1-1 may have a bent shape when viewed from the third direction DR3.

A display module 100-1 may include an image display unit DP, a frame FM, and a second coupling member CP2-1. A coupling groove GR1 may be defined in the lower part of the frame FM. The second coupling member CP2-1 may be disposed in the inner wall of the coupling groove GR1.

The first coupling member CP1-1 and the second coupling member CP2-1 may be slide-coupled to each other. The first coupling member CP1-1 may be a slide rail and the second coupling member CP2-1 may be a slider.

The cradle 200-1 may further include a signal transmission unit 210-1. The display module 100-1 may further include a signal reception unit 110-1. The signal transmission unit 210-1 may be provided in the form of a cable. The signal transmission unit 210-1 may receive a main control signal MCS from an electrical module 220A and provide an image signal ES to the signal reception unit 110-1. The signal reception unit 110-1 may have the form of a receiving terminal into which a cable is inserted.

The frame FM has a receiving groove GS1 and the signal reception unit 110-1 may be exposed through the receiving groove GS1. The receiving groove GS1 may pass through the floor of the coupling groove GR1. The receiving groove GS1 may have a shape that is bent along the coupling groove GR1.

The signal reception unit 110-1 may move along the coupling groove GR1 and the receiving groove GS1. The signal reception unit 110-1 may receive an image signal ES from the signal transmission unit 210-1. When the display module 100-1 and the cradle 200-1 are coupled to each other, the display module 100-1 may slidingly move while the signal transmission unit 210-1 and the signal reception unit 110-1 are coupled to each other.

The length W1 of the display module 100-1 may be greater than the length W2 of the cradle 200-1. When the display module 100-1 and the cradle 200-1 are coupled to each other, the display module 100-1 may be moved along the coupling groove GR1.

Figure 11A:
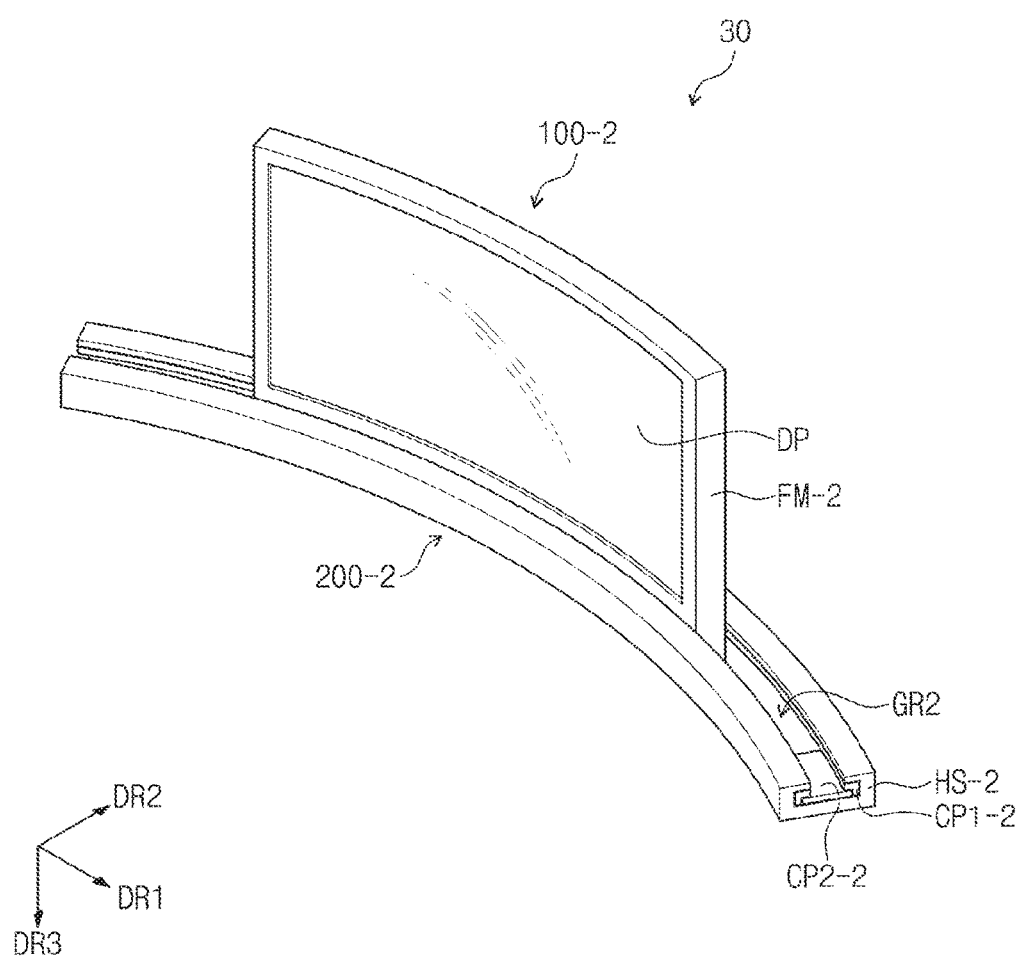
FIG. 11A is a schematic perspective view of a display device according to an exemplary embodiment.
Figure 11B:
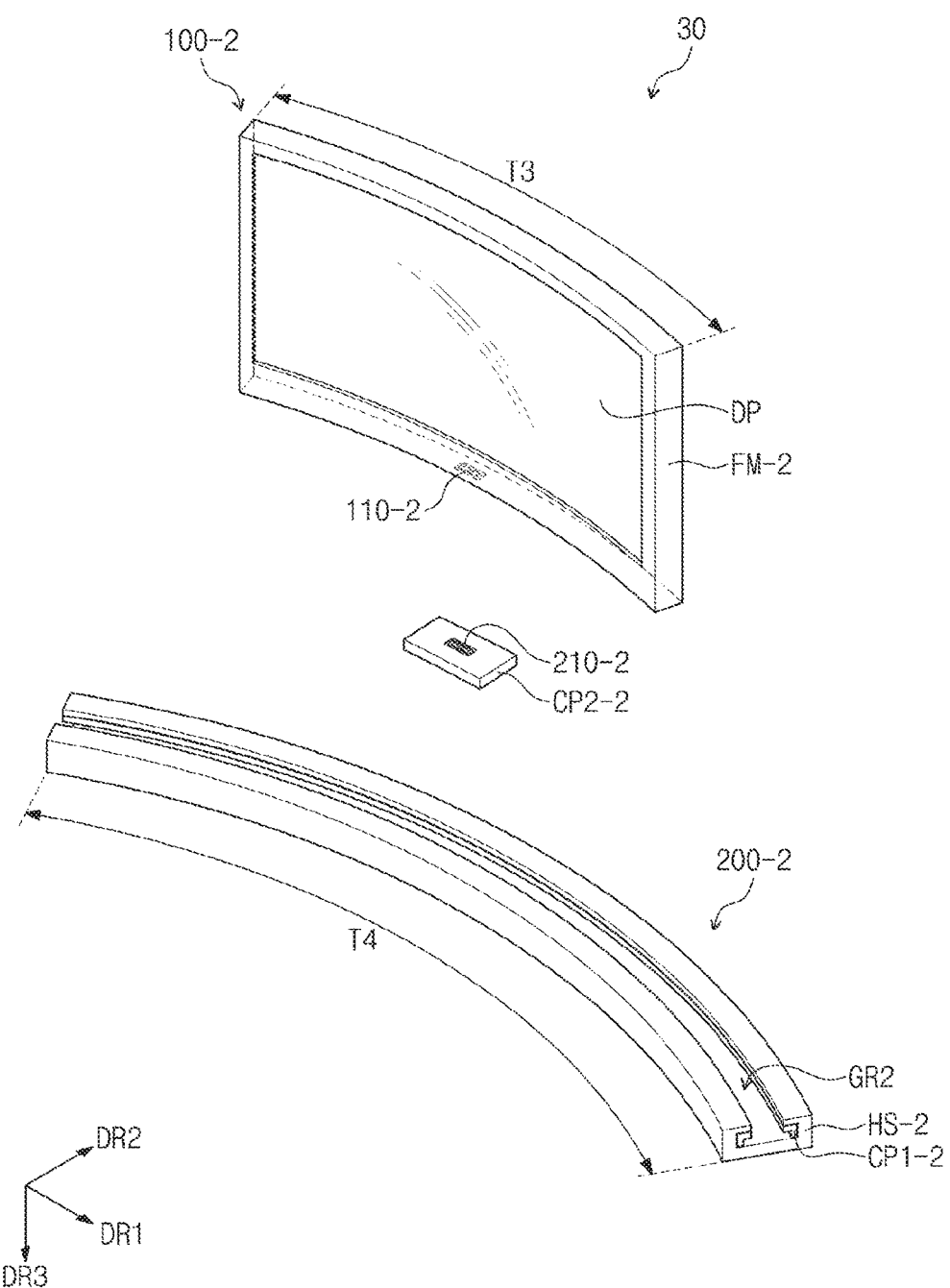
FIG. 11B is a schematic, exploded perspective view of a display device according to an exemplary embodiment.

FIG. 11A is a schematic perspective view of a display device according to an exemplary embodiment. FIG. 11B is a schematic, exploded perspective view of a display device according to an exemplary embodiment.

Hereinafter, the following description will be mainly focused on the difference between a display device 30 shown in FIGS. 11A and 11B and the display device 10 shown in FIGS. 1A and 1B.

A cradle 200-2 may include a housing HS-2, a first coupling member CP1-2, and a second coupling member CP2-2. The housing HS-2 and the first coupling member CP1-2 may be substantially similar to the housing HS and the first coupling member CP1 that are shown in FIGS. 1A and 1B.

The second coupling member CP2-2 may be coupled to the first coupling member CP1-2. The second coupling member CP2-2 may be slide-coupled to the first coupling member CP1-2. The first coupling member CP1-2 may be a slide rail and the second coupling member CP2-2 may be a slider.

The cradle 200-2 may further include a signal transmission unit 210-2 disposed in the second coupling member CP2-2. The signal transmission unit 210-2 may receive a main control signal MCS from an electrical module 220A and provide an image signal ES to a signal reception unit 110-2.

The signal transmission unit 210-2 may pass through the second coupling member CP2-2. When the cradle 200-2 and the display module 100-2 are decoupled from each other, one surface of the signal transmission unit 210-2 may be exposed by a coupling groove GR2. FIG. 11B illustrates that one surface of the signal transmission unit 210-2 has a quadrilateral shape on plan view and includes four receiving terminals. The signal transmission unit 210-2 may be connected directly to the electrical module 220A or connected in the form of a cable.

The display module 100-2 may be attached to or detached from the cradle 200-2. The display module 100-2 may include an image display unit DP, a frame FM-2, and a signal reception unit 110-2.

The signal reception unit 110-2 may be disposed at the bottom surface of the frame FM-2. When the cradle 200-2 and the display module 100-2 are decoupled, one surface of the signal reception unit 110-2 may be exposed.

When the display module 100-2 and the cradle 200-2 are coupled to each other, the signal reception unit 110-2 and the signal transmission unit 210-2 are electrically coupled to each other. The signal reception unit 110-2 may be disposed at the bottom surface of the frame FM-2 such that the coupling force between the signal reception unit 110-2 and the signal transmission unit 210-2 may be enhanced. In this manner, in the display device 30 according to an exemplary embodiment, the probability of fault that occurs when an image signal ES is transmitted from the signal transmission unit 210-2 to the signal reception unit 110-2 may be decreased, and thus, the reliability of the display device 30 may be increased.

The length T3 of the display module 100-2 may be greater than the length T4 of the cradle 200-2. When the display module 100-2 and the cradle 200-2 are coupled to each other, the display module 100-2 may be moved along the coupling groove GR2 of the cradle 200-2.

Figure 12A:
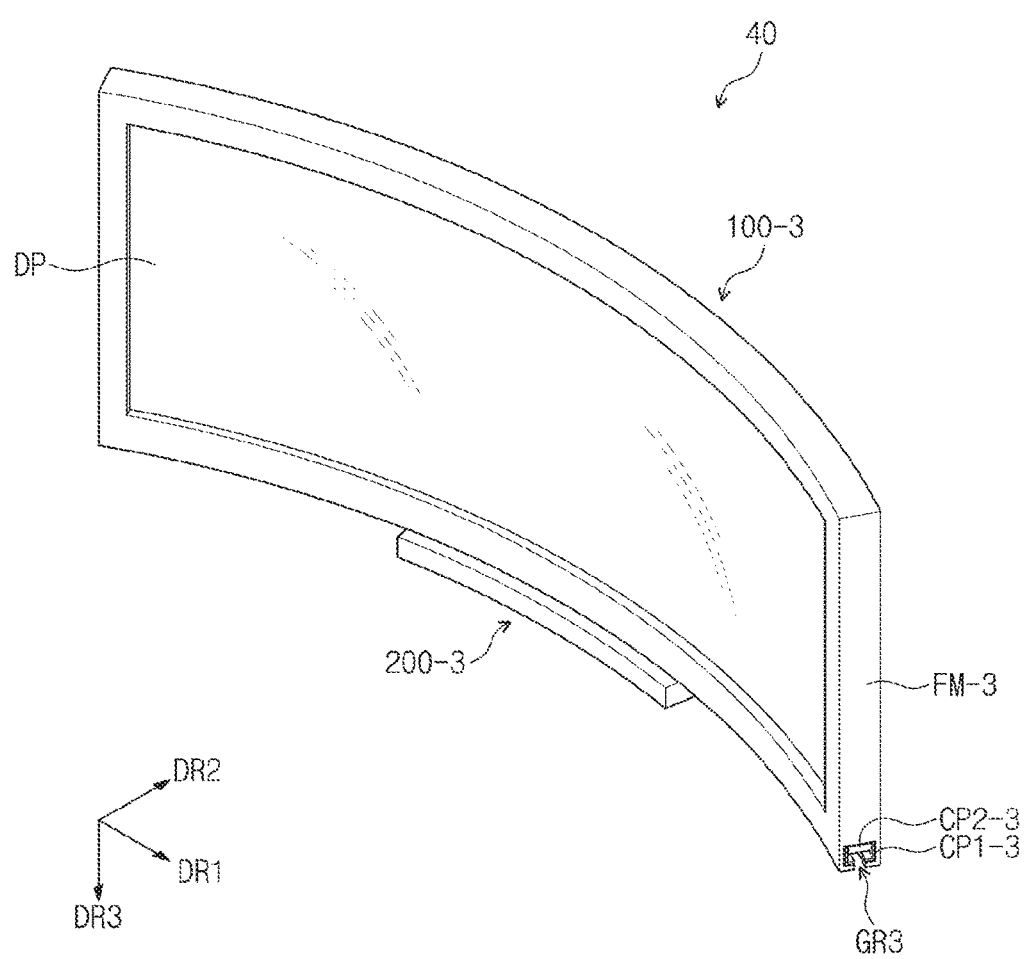
FIG. 12A is a schematic perspective view of a display device according to an exemplary embodiment.
Figure 12B:
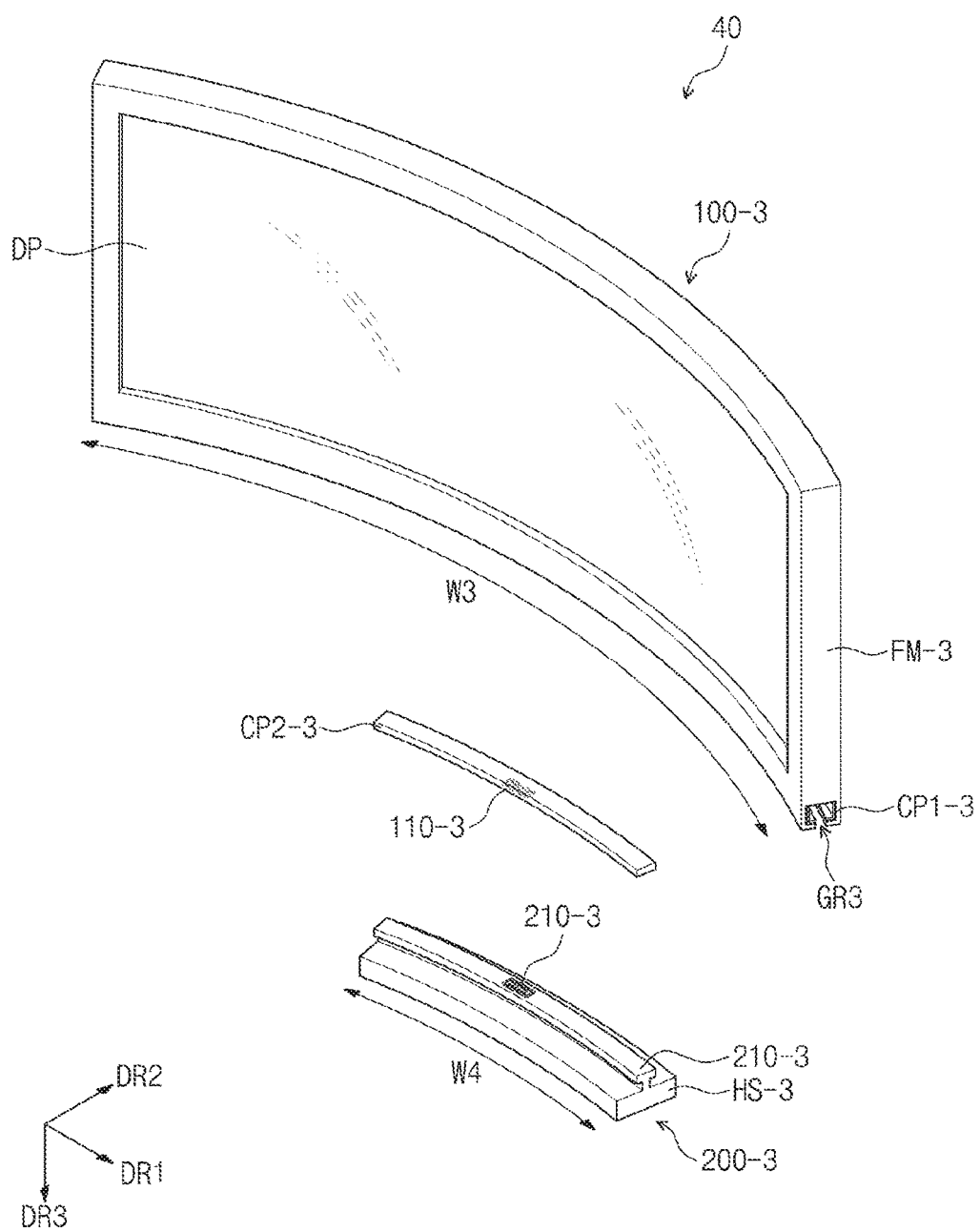
FIG. 12B is a schematic, exploded perspective view of a display device according to an exemplary embodiment.

FIG. 12A is a schematic perspective view of a display device according to an exemplary embodiment. FIG. 12B is a schematic, exploded perspective view of a display device according to an exemplary embodiment.

Hereinafter, the following description will be mainly focused on the difference between a display device 40 shown in FIGS. 11A and 11B and the display device 30 shown in FIGS. 1A and 1B.

The display module 100-3 may include an image display unit DP, a frame FM-3, a first coupling member CP1-3, and a second coupling member CP2-3.

A coupling groove GR3 may be defined in the lower part of the frame FM-3. The first coupling member CP1-3 may be disposed in the inner wall of the coupling groove GR3.

The second coupling member CP2-3 may be coupled to the first coupling member CP1-3. The second coupling member CP2-3 may be slide-coupled to the first coupling member CP1-3. The first coupling member CP1-3 may be a slide rail and the second coupling member CP2-3 may be a slider.

The display module 100-3 may further include a signal reception unit 110-3 disposed in the second coupling member CP2-3. When the display module 100-3 and a cradle 200-3 are coupled to each other, the signal reception unit 110-3 and a signal transmission unit 210-3 are electrically coupled to each other, such that the signal reception unit 110-3 may receive an image signal ES from the signal transmission unit 210-3.

The signal reception unit 110-3 may pass through the second coupling member CP2-3. One surface of the signal reception unit 110-3 may be exposed by the coupling groove GR3. FIG. 12B illustrates that one surface of the signal reception unit 110-3 has a quadrilateral shape on plan view and includes four receiving terminals. The signal reception unit 110-3 may be connected to the display panel control unit 115 (in FIG. 2) directly or through a cable.

The display module 100-3 may be attached to or detached from the cradle 200-3. The cradle 200-3 may include a housing HS-3 and the signal transmission unit 210-3. The signal reception unit 110-3 may be disposed at the top surface of the housing HS-3. When the cradle 200-3 and the display module 100-3 are decoupled from each other, one surface of the signal transmission unit 210-3 may be exposed.

The signal reception unit 110-3 may pass through the second coupling member CP2-3 such that the coupling force between the signal reception unit 110-3 and the signal transmission unit 210-3 may be enhanced through gravity. In this manner, in the display device 40 according to an exemplary embodiment, the probability of fault that may occur when an image signal ES is transmitted from the signal transmission unit 210-3 to the signal reception unit 110-3 may be decreased, such that the reliability of the display device 40 may be increased.

The length W3 of the display module 100-3 may be greater than the length W4 of the cradle 200-3. When the display module 100-3 and the cradle 200-3 are coupled to each other, the cradle 200-3 may move along the coupling groove GR3 of the display module 100-3.

According to exemplary embodiments, a display device may include a display module that may move along a circle of curvature of the display module to secure an optimal viewing angle even when the location of a user varies.

Furthermore, a display device according to exemplary embodiments, the display device may be formed slim. In addition, a display device according to exemplary embodiments may be individually managed, as the display module and the cradle therein may be decoupled from each other.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:

1. A display device comprising:
   a cradle comprising:
      a signal transmission unit configured to transmit an image signal;
      a housing exposing the signal transmission unit; and
      a first coupling member disposed in the housing; and
   a display module having a curved shape along a radius of a curvature, the display module comprising:
      a signal reception unit configured to receive the image signal;
      an image display unit configured to display an image based on the image signal; and
      a second coupling member,
   wherein:
   the display device is configured to operate in any one of a first state and a second state;
   during the first state, the cradle and the display module are decoupled from each other; and
   during the second state, the first coupling member and the second coupling member are slide-coupled to each other such that the display module moves along the circumference of a circle of the curvature of the display module.

2. The display device of claim 1, wherein:
   the first coupling member comprises a slide rail; and
   the second coupling member comprises a slider slide-coupled to the slide rail.

3. The display device of claim 2, wherein:
   the housing comprises a coupling groove bent along the radius of the curvature; and
   the first coupling member is disposed in an inner wall of the coupling groove.

4. The display device of claim 2, wherein a length of the display module is less than a length of the cradle.

5. The display device of claim 3, wherein:
   the signal reception unit is disposed at a bottom surface of the second coupling member; and
   the signal reception unit and the signal transmission unit are electrically coupled to each other during the second state.

6. The display device of claim 5, wherein during the second state, the signal transmission unit moves along the coupling groove when the signal transmission unit is coupled to the signal reception unit.

7. The display device of claim 1, wherein the cradle further comprises an electrical module configured to generate a main control signal to be provided to the signal transmission unit.

8. The display device of claim 1, wherein:
   the second coupling member comprises a slide rail; and
   the first coupling member comprises a slider slide-coupled to the slide rail.

9. The display device of claim 8, wherein the first coupling member is protruded from a top surface of the housing.

10. The display device of claim 8, wherein:
    the display module further comprises a frame surrounding the image display unit, a lower part of the frame comprising a coupling groove bent along the radius of the curvature; and
    the second coupling member is disposed in an inner wall of the coupling groove.

11. The display device of claim 8, wherein a length of the cradle is shorter than a length of the display module.

12. The display device of claim 10, wherein:
    the signal transmission unit is disposed at a top surface of the first coupling member; and
    during the second state, the signal reception unit and the signal transmission unit are electrically coupled to each other.

13. The display device of claim 12, wherein during the second state, the signal reception unit moves along the coupling groove when the signal reception unit is coupled to the signal transmission unit.

14. A display device comprising:
    a cradle comprising:
       a signal transmission unit configured to transmit an image signal; and
       a first coupling member and a second coupling member slide-coupled to the first coupling member, the signal transmission unit disposed in the second coupling member; and
    a display module comprising:
       a signal reception unit configured to receive the image signal; and
       an image display unit having a bent shape and configured to display an image based on the image signal,
    wherein:
    the display device is configured to operate in any one of a first state and a second state,
    during the first state, the cradle and the display module are decoupled from each other, and during the second state, the display module and the second coupling member are coupled such that the signal transmission unit and the signal reception unit are electrically connected to each other.

15. The display device of claim 14, wherein:
the first coupling member comprises a slide rail; and
the second coupling member comprises a slider slide-coupled to the slide rail.

16. The display device of claim 14, wherein:
the cradle further comprises a housing, the housing comprising a coupling groove bent along the radius of the curvature; and
the first coupling member is disposed in an inner wall of the coupling groove.

17. The display device of claim 14, wherein a length of the display module is less than a length of the cradle.

18. A display device comprising:
a cradle comprising a signal transmission unit configured to transmit an image signal; and
a display module comprises:
    a signal reception unit configured to receive the image signal;
    an image display unit configured to display an image based on the image signal; and
    a first coupling member and a second coupling member slide-coupled to the first coupling member,
wherein:
the display device is configured to operate in any one of a first state and a second state;
during the first state, the cradle and the display module are decoupled from each other; and
during the second state, the cradle and the second coupling member are in contact with each other such that the signal transmission unit and the signal reception unit are electrically connected to each other.

19. The display device of claim 18, wherein:
the second coupling member comprises a slide rail; and
the first coupling member comprises a slider slide-coupled to the slide rail.

20. The display device of claim 18, wherein:
the display module further comprises a frame surrounding the image display unit, a lower part of the frame comprises a coupling groove bent along the radius of the curvature;
the first coupling member is disposed in an inner wall of the coupling groove; and
a length of the cradle is less than a length of the display module.

* * * * *